(12) United States Patent
Benjamin et al.

(10) Patent No.: US 9,339,947 B2
(45) Date of Patent: May 17, 2016

(54) METALLIC EXTRUSION PROCESSING ELEMENTS

(71) Applicant: Entek Manufacturing LLC, Lebanon, OR (US)

(72) Inventors: Craig Benjamin, Lebanon, OR (US); Larry Keith, Salem, OR (US)

(73) Assignee: Entek Manufacturing LLC, Lebanon, OR (US)

( * ) Notice: Subject to any disclaimer, the term of this patent is extended or adjusted under 35 U.S.C. 154(b) by 109 days.

(21) Appl. No.: 14/082,002

(22) Filed: Nov. 15, 2013

(65) Prior Publication Data

US 2014/0069778 A1 Mar. 13, 2014

Related U.S. Application Data

(62) Division of application No. 12/822,083, filed on Jun. 23, 2010, now Pat. No. 8,595,910.

(51) Int. Cl.
| | |
|---|---|
| *B29B 7/80* | (2006.01) |
| *B22F 5/10* | (2006.01) |
| *B22F 7/06* | (2006.01) |
| *B29C 47/08* | (2006.01) |
| *B65G 33/26* | (2006.01) |

(Continued)

(52) U.S. Cl.
CPC . *B29B 7/80* (2013.01); *B22F 5/106* (2013.01); *B22F 7/062* (2013.01); *B29C 47/08* (2013.01); *B29C 47/6075* (2013.01); *B29C 47/625* (2013.01); *B65G 33/265* (2013.01); *B22F 2999/00* (2013.01); *Y10T 29/49723* (2015.01); *Y10T 29/49728* (2015.01); *Y10T 29/49732* (2015.01)

(58) Field of Classification Search
CPC ........ B22F 2999/00; B22F 5/106; B22F 3/20; B22F 5/085; B22F 7/062; B29B 7/80; B29C 47/08; B29C 47/6075; B29C 47/625; H02K 15/0056; H02K 15/0081; H02K 1/24; H02K 3/12; H02K 3/51; Y10T 29/49723
See application file for complete search history.

(56) References Cited

U.S. PATENT DOCUMENTS

| | | | |
|---|---|---|---|
| 4,544,523 | A | 10/1985 | McCollough et al. |
| 4,808,055 | A | 2/1989 | Wertz et al. |

(Continued)

FOREIGN PATENT DOCUMENTS

WO WO 94-11140 A1 5/1994

OTHER PUBLICATIONS

Coperion ZSK Screw Elements, Mat Presentation (9 pages), Sep. 1, 2006.

*Primary Examiner* — Sally Merkling
(74) *Attorney, Agent, or Firm* — Stoel Rives LLP (57) ABSTRACT

A restored metallic extrusion processing element comprises a tubular metal core around which is consolidated a powdered metal extrusion component that includes metallurgically bonded interior shell and exterior working portions. The interior shell portion covers the core and is characterized by a first multiple-crystalline microstructure, and the exterior working portion is characterized by a second multiple crystalline microstructure of densified powdered metal particles. The exterior working portion has an outside surface including outer working surface features that extend along the length of the extrusion processing element. A bond interface of metallurgical type defines a crystalline microstructure boundary between the first and second multiple-crystalline microstructures.

7 Claims, 5 Drawing Sheets

(51) Int. Cl.
   *B29C 47/60*   (2006.01)
   *B29C 47/62*   (2006.01)

(56) References Cited

U.S. PATENT DOCUMENTS

| | | |
|---|---|---|
| 4,824,256 A | 4/1989 | Häring et al. |
| 5,043,137 A | 8/1991 | Lazcano-Navarro et al. |
| 5,318,358 A | 6/1994 | Wobbe et al. |
| 5,540,882 A * | 7/1996 | Billgren .................. 419/8 |
| 6,116,770 A | 9/2000 | Kiani et al. |
| 6,116,771 A | 9/2000 | Andersen |
| 6,470,568 B2 | 10/2002 | Fried et al. |
| 8,318,063 B2 * | 11/2012 | Mirchandani et al. ........ 264/125 |
| 2003/0106198 A1 | 6/2003 | Kowalczyk et al. |

* cited by examiner

METALLIC EXTRUSION PROCESSING ELEMENTS

RELATED APPLICATION

This is a division of U.S. patent application Ser. No. 12/822,083, filed Jun. 23, 2010, now U.S. Pat. No. 8,595,910.

COPYRIGHT NOTICE

©2013 Entek Manufacturing LLC. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This disclosure relates to extrusion processing systems and, in particular, to metallic extrusion processing elements restored to substantially new condition for reuse in extrusion processing systems.

BACKGROUND INFORMATION

A significant cause of wear of metallic extrusion processing component parts is mixing or transporting of material by two co-rotating or counterrotating processing elements. Wear manifests itself in corrosion or abrasion of exterior working surfaces of the component parts. High wear, corrosion resistant extrusion processing component parts often are made from powdered metal (PM) tool steels. A bimetallic material design is used to minimize the amount of PM material needed to make the component parts. In the case of an extrusion screw element, the bimetallic material includes an inside core, with a layer of PM tool steel consolidated around the core by pressure applied by hot isostatic pressing (HIP). The core is typically made from a round bar of mild steel, such as AISI 1018 (low carbon) mild steel or stainless steel.

The following is a brief description of a conventional process of manufacturing an extrusion screw element. The mild steel round bar is placed inside of a cylindrical container (typically made of mild steel) and supported within the container by two end caps. Filling stems are attached to one of the end caps. The container is seal-welded together and checked for leaks to verify that it is hermetically sealed. After the container is assembled, the PM material is delivered through the filling stems to fill the space inside the container between its inner wall and the outside surface of the core material. Once the container is filled with PM material, vacuum is pulled on the container. As vacuum is achieved, the container assembly is heated to facilitate removal of contaminants. The container is sealed when specified temperature and vacuum levels are reached. The sealed container is then placed in a HIP furnace and consolidated into a fully dense material that is composed of the PM material fully bonded to the core material. During the HIP cycle, the container deforms as the PM material densifies so that the final assembly becomes substantially free from voids. This process is called running a HIP cycle, in which materials are bonded in a solid state.

The container is cut away from the HIP processed material. Exterior working features in the form of material conveying or transporting flights of the extrusion screw elements are machined from the outer PM layer of HIP processed material. Machining entails whirling, milling, or turning operations. Before finish machining is performed, the extrusion screw elements are heat treated so that the PM material becomes hard and abrasion resistant and the core material remains soft.

The above-described extrusion screw element manufacturing process wastes a significant amount of PM material. The flights of a typical extruder conveying screw are created by machining a helical channel into the outside surface of the conveying screw. (Conveying screws have one or more screw flights, and most conveying screws have two screw flights.) The helical channel is typically machined along the entire length of the conveying screw. Extrusion screw processing component parts of this type are made for a wide range of extruder sizes (diameters). A larger diameter extruder conveying screw produces a larger amount of wasted PM material during fabrication. When they wear out, the PM extruder conveying screws are discarded because the PM material is not weld repairable.

Plasma transfer arc (PTA) weld overlay is another method of making extruder conveying screws. PTA weld overlay entails creating a hard outer layer of wear, corrosion resistant material at the tips of the flights on the outside surfaces of the extruder conveying screws. This is achieved by first machining a helical groove into a length of weldable round bar. The helical grooves serve as a weld preparation area in which the PTA weld overlaying process is performed. After the welding has been performed, the screw flights are machined into the outside surface of the extruder conveying screw and timed so that the tips of the screw flights land in the overlaid material. Another method entails machining the extruder conveying screws first and then welding the hard outer layer of material to the extruder conveying screws after they have been machined. This method generally requires touchup machining after the flights have been welded. The PTA process creates an extruder conveying screw that has hard material at the tips of the flights, but the remainder of the flights has no protection against wear or corrosion. Screw flights made using the PTA weld overlay process can be restored for reuse, but only with weldable restoration materials. This limitation precludes use in the PTA process of many alloys that exhibit one or both of wear and corrosion resistance properties.

SUMMARY OF THE DISCLOSURE

The disclosed methods and equipment restore worn metallic extrusion processing elements to substantially new condition for reuse in extrusion processing systems. Extrusion processing elements include lobe elements for kneading or mixing material or conveying flight elements for transporting material. The worn extrusion processing element includes a metal body that is metallurgically bonded around a tubular metal core having an inside surface in which a torque transmitting profile is formed. The extrusion processing element is characterized by a nominal multiple-crystalline microstructure of intermetallic compounds and has an outside surface including worn outer working surface features that extend along the length of the worn extrusion processing element.

A preferred method of restoring the worn metallic extrusion processing element for reuse entails assembling and placing the worn extrusion processing element in a container that is designed to hold material introduced into the container to undergo isostatic pressure densification. The container is filled with restoration powdered metal particles. The restoration powdered metal particle-filled container is sealed and placed in an isostatic press vessel to densify the restoration powdered metal particles and to bond them to the metal body of the worn extrusion processing element to form an unfinished restored extrusion processing element. The densified restoration powdered metal particles are characterized by a restoration multiple-crystalline microstructure of intermetallic compounds and separated from the metal body by a metallurgical bond interface that defines a crystalline microstructure boundary between the nominal and restoration multiple-crystalline microstructures. The container is separated from the unfinished restored extrusion processing element, which is then provided with a tubular core having an inner surface with a torque transmitting profile. The densified restoration powdered metal particles are machined to form a restored outside surface including restored outer working surface features.

The restored metallic extrusion processing element comprises a tubular metal core around which is consolidated a powdered metal extrusion component that includes metallurgically bonded interior shell and exterior working portions. The interior shell portion covers the core and is characterized by a first multiple-crystalline microstructure of intermetallic compounds, and the exterior working portion is characterized by a second multiple-crystalline microstructure of densified powdered metal particles. The exterior working portion has an outside surface including outer working surface features that extend along the length of the extrusion processing element. A bond interface of metallurgical type defines a crystalline microstructure boundary between the first and second multiple-crystalline microstructures.

Additional aspects and advantages will be apparent from the following detailed description of preferred embodiments, which proceeds with reference to the accompanying drawings.

DETAILED DESCRIPTION OF PREFERRED EMBODIMENTS

Figure 1A:
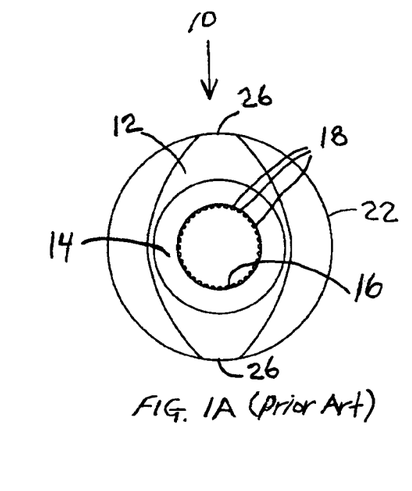
FIGS. 1A, 1B, and 1C are respective frontal, side elevation, and isometric views of a prior art original, finished extruder conveyor screw.
Figure 1B:
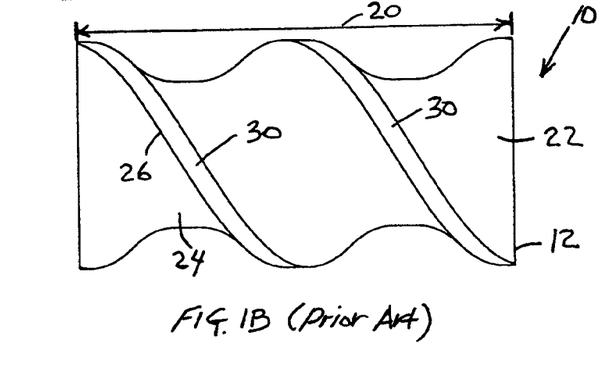
Figure 1C:
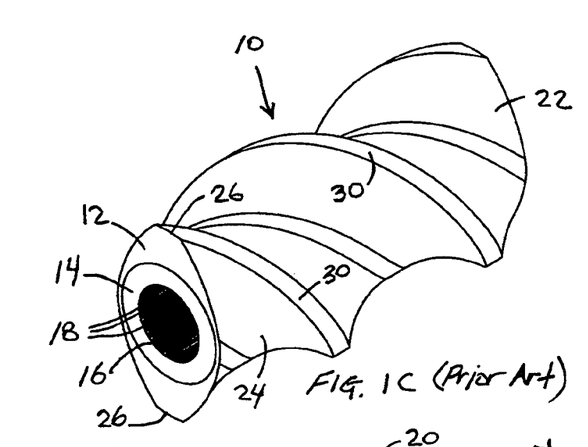

The following descriptions are presented with reference to embodiments of a conveyor screw as one example of an extrusion processing element to which this disclosure applies. FIGS. 1A, 1B, and 1C are respective frontal, side elevation, and isometric views of a prior art original, finished extruder conveyor screw 10. With reference to FIGS. 1A, 1B, and 1C, conveyor screw 10 includes a powdered metal body 12 that is consolidated around a tubular metal core 14 of cylindrical shape. Powdered metal body 12 exhibits throughout its interior a nominal two-crystalline microstructure of intermetallic compounds. Core 14 has an inside surface 16 in which splines 18 functioning as a torque transmitting profile are formed. Powdered metal body 12 has a length 20 and an outside surface 22, the latter of which including working surface features. Two helical channels 24 inscribed in outside surface 22 form outwardly extending working surface features or flights 26 that describe two spiral patterns along length 20 of powdered metal body 12. Each flight 26 has an outer surface 30 in the shape of a cylindrical segment that over time wears away and loses its operational functionality by conveying one or both of corrosive and abrasive workpiece materials. Other portions of outside surface 22 between helical channels 24 and outer surfaces 30 undergo similar damage. Conveyor screw 10 eventually fails to meet specified dimensions (i.e., screw outer surface 30 becomes too small) and thereby reaches a worn condition that ends its useful operational life.

Figure 2A:
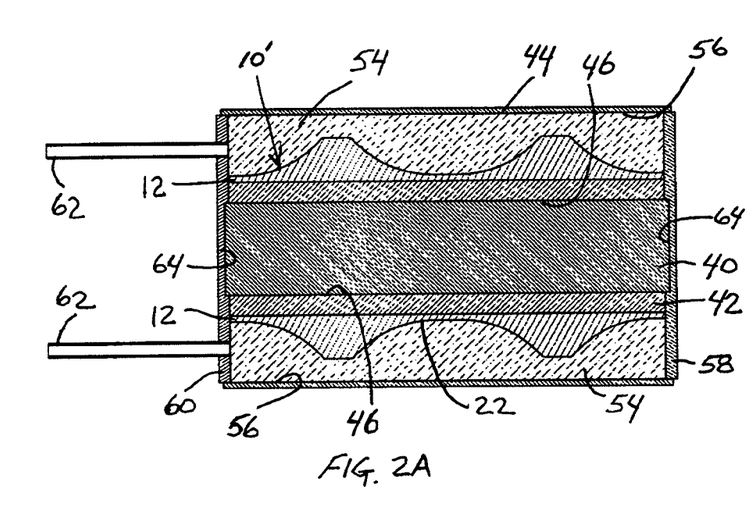
FIGS. 2A and 2B are respective lengthwise and transverse cross-sectional views of a re-cored worn extruder screw placed inside a container to undergo restoration processing.
Figure 2B:
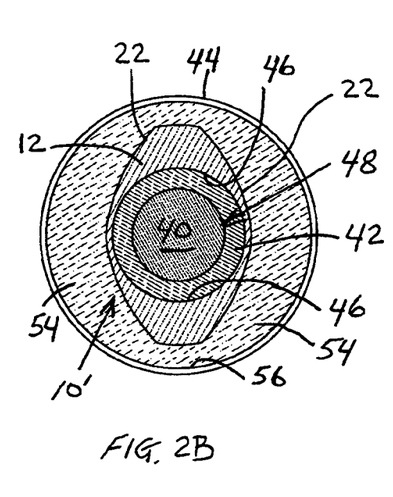

The description below sets forth a method of restoring a worn extruder screw 10 to substantially new condition for use in an extrusion processing system (not shown). FIGS. 2A and 2B are respective lengthwise and transverse cross sectional views of a re-cored worn extruder screw 10' including powdered metal body 12 of worn extruder screw 10 fitted with a new, solid metal core bar 40 in a reduced tubular core 42 and placed in a steel container 44 to undergo restoration processing, and FIG. 2C is an enlarged isometric view with a portion of container 44 cut away to show placement of re-cored worn extruder screw 10' inside of container 44.

Figure 2C:
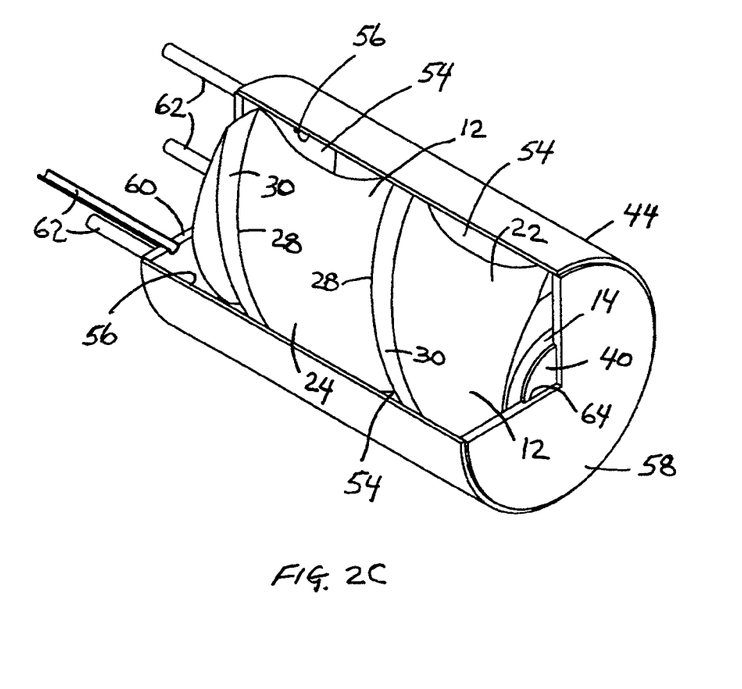
FIG. 2C is an enlarged isometric view of the container of FIGS. 2A and 2B presented with a portion of the container cut away to show placement of the re-cored worn screw inside the container.

With reference to FIGS. 2A, 2B, and 2C, an initial step in restoration entails cleaning from worn extruder screw 10 detritus such as metal oxides, binders, and degraded plastics accumulated over time by extrusion operations. This initial step is followed by machining away splines 18. Splines 18 are removed because they would become distorted by the HIP application described below. Part or all of tubular metal core 14 may additionally be removed. Depending on the amount of core 14 material removed, the result is a smooth, preferably cylindrically shaped, processing element inside surface 46 of tubular metal core 14 or powdered metal body 12. In the embodiment shown in FIGS. 2A, 2B, and 2C, processing element inside surface 46 defines in reduced tubular core 42 a central opening 48 into which core bar 40 is inserted to form re-cored worn extruder screw 10'.

Extruder screw 10' is then placed inside container 44, leaving a void area 54 between outside surface 22 of extruder screw 10' and an inner surface 56 of container 44. A solid end cap 58 closes one end of container 44, and an end cap 60 through which four fill tubes 62 pass closes the other end of container 44. FIG. 2A shows that core bar 40 extends outwardly from each end of powdered metal body 12 and fits into recesses 64 in the inside surfaces of end caps 58 and 60 to secure extruder screw 10' in a fixed position inside of container 44 when it is closed by a seal weld. Raw restoration powdered metal particles are delivered through fill tubes 62 to fill void area 54 with material that is metallurgically compatible with the material of powdered metal body 12. Powdered metal particles like Micro-Melt® 420CW (product designator of Carpenter Powder Products) can be used. Powders of this type are available from Carpenter Powder Products, Bridgeville, Pa.; Niagara Specialty Metals, Akron, N.Y.; and Erasteel, Boonton, N.J. Vacuum is pulled on filled container 44, and fill tubes 62 are crimped and welded to a completely closed state to maintain a tight vacuum seal of container 44.

Vacuum-sealed container 44 is placed in a HIP furnace (not shown), which is a vessel that applies at elevated temperature isostatic pressure to form a metallurgical bond between core bar 40 and processing element inside surface 46 and to densify the restoration powdered metal particles to powdered metal body 12 of extruder screw 10'. A preferred HIP application on container 44 is performed for four hours at 2065° F.±25° F. at 15,000 psi. The result is an unfinished restored extruder screw (not shown). One suitable HIP furnace is a commercial hot isostatic press available from Avure Technologies, Inc., Kent, Wash. The addition of restoration powdered metal particles followed by HIP application diminishes the hardness of powdered metal body 12, giving a diminution in hardness from about 56 HRC to about 22 HRC. (HRC refers to the Rockwell hardness scale for hard materials.) The hardness of powdered metal body 12 after HIP application is greatly reduced to an annealed state that is readily machinable. Upon completion of HIP application, container 44 is machined from and end caps 58 and 60 are cut off the unfinished restored extruder screw. Core bar 40 is provided with a central longitudinal pilot bore 70 having an inside surface 72. A torque transmitting profile in the form of splines 18' is inscribed in inside surface 72 by pulling of a broach through pilot bore 70. Alternative torque transmitting profiles include one or more keyways or multiple straight surface sections defining a polygonal (preferably hexagonal) contour for inside surface 72. Outside surface 22 is machined to form screw flights 26 to proper size. A heat treating process is performed to provide restored extruder screw 10" with substantially uniform hardness at about 56 HRC to 59 HRC. The densified restoration powdered metal particles are finish machined and the end faces of unfinished restored extruder screw are ground to form a restored extruder screw 10" (FIG. 3) that has a restored outer surface 30 in the shape of a cylindrical segment and has specified finish length and thread timing. Under such conditions, post-HIP application annealing of container 44 is common to make machining of the unfinished extruder screw easier.

Figure 3:
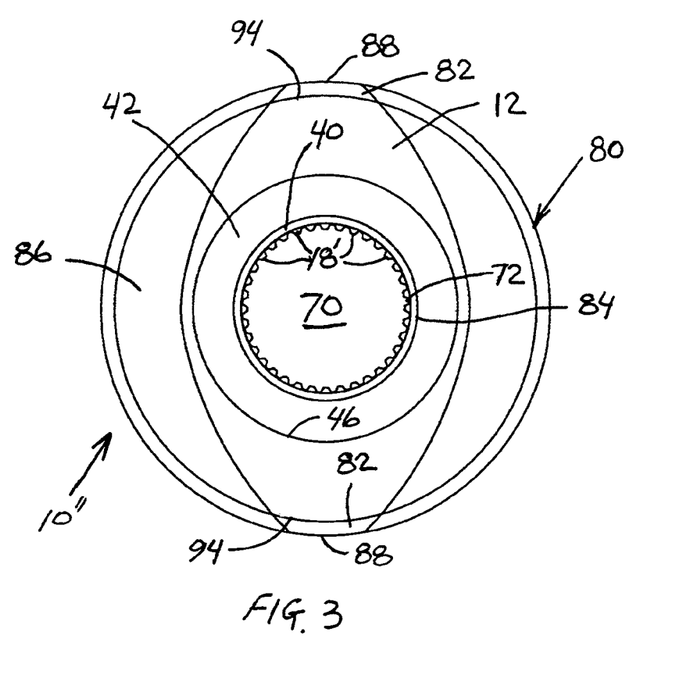
FIG. 3 is an end view of a restored extruder screw produced in accordance with the disclosed method.

FIG. 3 is an end view of restored extruder screw 10". With reference to FIG. 3, restored extruder screw 10" includes a powdered metal extrusion component 80 consolidated around reduced tubular core 42. Extrusion component 80 includes powdered metal body 12 that is metallurgically bonded to densified restoration powdered metal particles 82. Powdered metal body 12 forms an interior shell portion that covers reduced tubular core 42. A metallurgical core bond interface 84 defines a boundary between reduced tubular core 42 and core bar 40. A layer of densified restoration powdered metal particles 82 forms an exterior working portion that has an outside surface 86 including outer working surface features 88 extending along the length of restored extruder screw 10".

Figure 4:
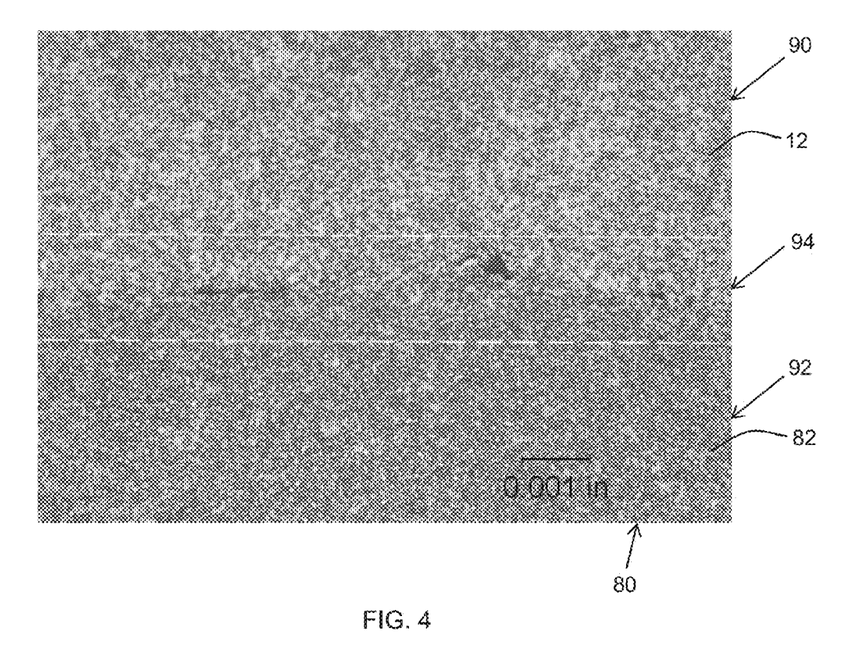
FIG. 4 is a photomicrograph showing a cross-sectional view of the multiple-crystalline microstructure of the interior of a powdered metal extrusion component of the restored extruder screw shown in FIG. 3.

FIG. 4 is a photomicrograph showing a cross sectional view of powdered metal body 12 and layer of densified restoration powdered metal particles 82. The dark regions are a primary carbide phase, and the light regions are a tempered Martensite phase. The tempered Martensite phase has a body-centered tetragonal crystal lattice structure in which very small secondary carbide particles (not visible in FIG. 4) reside. The sizes of primary carbide phase particles are a function of the solidification rate and temperature characterizing a hardening process. In the photomicrograph, there are present physically different intermetallic compounds that form the crystalline microstructure of the interior of powdered metal extrusion component 80.

With reference to FIG. 4, powdered metal body 12 is characterized by a first two-crystalline microstructure 90 of intermetallic compounds, and the layer of densified restoration metal particles 82 is characterized by a second two-crystalline microstructure 92 of intermetallic compounds. Each of two-crystalline microstructures 90 and 92 represents two solid state phases of an alloy composed of a primary carbide phase present in a tempered Martensite phase. A metallurgical bond interface 94 defines a crystalline microstructure boundary between two-crystalline microstructures 90 and 92. Crystalline microstructure 90 of powdered metal body 12 of worn extruder screw 10 exhibits a carbide volume fraction that is less than the carbide volume fraction of crystalline microstructure 92 of densified restoration powdered metal particles 82 of restored extruder screw 10".

The difference in volume fractions of the primary carbide particles in two-crystalline microstructures 90 and 92 was the result of different chemistries in the alloys that comprise the two microstructures. The disclosed method is equally applicable when the chemistries of powdered metal body 12 and powdered metal particles 82 are the same or nearly the same. Successful restoration of conveyor screw 10 necessitates that metallurgical bond interface 94 form between the original screw alloy of powdered metal body 12 and the restoration alloy of powdered metal particles 82.

The character of each of two-crystalline microstructures 90 and 92 is established by their chemistry and processing. One of the reasons for the difference in carbide volume fractions of two-crystalline microstructures 90 and 92 is PM particle chemistry. Powdered metal body 12 was formed of densified powdered metal similar to PM 10V, and layer of densified restoration metal particles 82 was formed of 420CW particles. The initial composition of 420CW particles exhibits a greater carbide volume fraction than that of the initial composition of PM 10V particles. A tempering process performed after heat treatment increased the toughness of the materials. The heat treatment entailed austinitization at 2100° F. in a vacuum furnace, quenching at 58.015 psig (4 bar) pressure, and subsequent double tempering at 600° F. After heat treating of restored extruder screw 10", powdered metal body 12 exhibited 62 HRC hardness, densified restoration metal particles exhibited 59 HRC hardness, and bond interface 94 exhibited 60 HRC. (HRC conversion is based on ATSM E140-07, Table 1.)

Although it is directed to restoration of conveyor screw 10 that includes powdered metal body 12, the above-described method can also be practiced on a conveyor screw in which the worn metal body is made of non-powdered metal material, such as D2, H13, or nitride 135M tool steel.

It will be obvious to those having skill in the art that many changes may be made to the details of the above-described embodiments without departing from the underlying principles of the invention. For example, forming metallurgical bonds can be performed by cold isostatic pressing (CIP) as an alternative to HIP. The scope of the present invention should, therefore, be determined only by the following claims.

The invention claimed is:

1. A restored metallic extrusion processing element having a length along which outer working surface features extend, comprising:

a powdered metal extrusion component including metallurgically bonded interior shell and exterior working portions, the interior shell portion including a previously densified powdered metal body and characterized by a first multiple-crystalline microstructure, and the exterior working portion including a layer of densified powdered metal particles consolidated by hot isostatic pressing onto the previously densified powdered metal body, the layer of densified powdered metal particles characterized by a second multiple-crystalline microstructure and having an outside surface that includes outer working surface features extending along the length of the extrusion processing element; and a bond interface of metallurgical type defining a crystalline microstructure boundary between the first and second multiple-crystalline microstructures.

2. The extrusion processing element of claim 1, further comprising a tubular metal core around which the interior shell portion of the powdered metal extrusion component is consolidated, the tubular metal core having an inside surface in which a torque transmitting profile is formed.

3. The extrusion processing element of claim 2, in which splines extending along the length of the extrusion processing element define the torque transmitting profile.

4. The extrusion processing element of claim 2, in which one or more keyways extending along the length of the extrusion processing element define the torque transmitting profile.

5. The extrusion processing element of claim 2, in which the torque transmitting profile is formed by multiple inside surface sections defining a polygonal contour.

6. The extrusion processing element of claim 1, in which the first and second multiple-crystalline microstructures are of different hardnesses.

7. The extrusion processing element of claim 1, further comprising a tubular metal core around which the interior shell portion of the powdered metal extrusion component is consolidated, the tubular metal core having inner and outer sections separated by a core bond interface, the inner section having an inside surface in which a torque transmitting profile is formed, and the outer section covered by the interior shell portion.

* * * * *